US008925082B2

(12) United States Patent
Ashley (10) Patent No.: US 8,925,082 B2
(45) Date of Patent: Dec. 30, 2014

(54) COOPERATIVE INTRUSION DETECTION ECOSYSTEM FOR IP REPUTATION-BASED SECURITY

(75) Inventor: Paul Anthony Ashley, Brisbane (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/591,456

(22) Filed: Aug. 22, 2012

(65) Prior Publication Data

US 2014/0059683 A1 Feb. 27, 2014

(51) Int. Cl.
*H04L 29/06* (2006.01)
(52) U.S. Cl.
CPC ........................................ *H04L 63/14* (2013.01)
USPC .......................................................... 726/23
(58) Field of Classification Search
USPC ............................................................ 726/23
IPC ........................................................ H04L 63/14
See application file for complete search history.

(56) References Cited

U.S. PATENT DOCUMENTS

| | | | |
|---|---|---|---|
| 7,370,358 B2 | 5/2008 | Ghanea-Hercock | |
| 7,464,158 B2 | 12/2008 | Albornoz | |
| 7,730,537 B2 | 6/2010 | Bardsley et al. | |
| 7,845,004 B2 | 11/2010 | Bardsley et al. | |
| 7,845,007 B1 | 11/2010 | Kennis | |
| 7,941,855 B2 | 5/2011 | Sung et al. | |
| 8,424,091 B1* | 4/2013 | Su et al. | 726/24 |
| 2002/0133594 A1* | 9/2002 | Syvanne | 709/226 |
| 2008/0306715 A1* | 12/2008 | Tsai et al. | 703/2 |
| 2010/0235915 A1* | 9/2010 | Memon et al. | 726/23 |
| 2011/0055923 A1* | 3/2011 | Thomas | 726/23 |
| 2012/0284793 A1* | 11/2012 | Steinbrecher et al. | 726/23 |
| 2012/0297042 A1* | 11/2012 | Davis et al. | 709/223 |
| 2013/0139245 A1* | 5/2013 | Thomas | 726/13 |
| 2013/0298230 A1* | 11/2013 | KUMAR et al. | 726/22 |

OTHER PUBLICATIONS

Gerrigagoitia, K., et al, "Reputation-based Intrusion Detection System for wireless sensor networks," Complexity in Engineering (COMPENG), 2012, vol., No., pp. 1,5, Jun. 11-13, 2012.
Kreibich, C., et al, "Policy-controlled event management for distributed intrusion detection," Distributed Computing Systems Workshops, 2005. 25th IEEE International Conference on, vol., No., pp. 385-391, Jun. 6-10, 2005.

(Continued)

*Primary Examiner* — Techane Gergiso
(74) *Attorney, Agent, or Firm* — Jeffrey S. LaBaw; David H. Judson (57) ABSTRACT

An intrusion detection system (IDS) is enhanced to operate in a cluster of such systems, and IDSs organized into a cluster cooperate to exchange IP reputation influencing events information between or among the cooperating systems in real-time to enhance overall system response time and to prevent otherwise hidden attacks from damaging network resources. An IDS includes an IP reputation analytics engine to analyze new and existing events, correlate information, and to raise potential alerts. The IP reputation analytics engines may implement an algorithm, such as a pattern matching algorithm, a continuous data mining algorithm, or the like, to facilitate this operation. Clustering IDS endpoints to share IP reputation influencing events, using the cluster-wide view to determine IP reputation, and feeding the cluster-wide view back to the IDS endpoints, provides for enhanced and early detection of threats that is much more reliable and scalable as compared to prior art techniques.

25 Claims, 6 Drawing Sheets

(56) References Cited

OTHER PUBLICATIONS

Thomas, A., "Rapid: Reputation based approach for improving intrusion detection effectiveness," Information Assurance and Security (IAS), 2010 Sixth International Conference on, pp. 118,124, Aug. 23-25, 2010.

International Search Report and Written Opinion, PCT/CA2013/050647, Nov. 25, 2013.

* cited by examiner

| CURRENT LEVEL | LAST DATE OF ACTIVITY | TYPE OF ACTIVITY | IP ADDRESS/URL |
|---|---|---|---|
| LOW | 01/12/10 | SPAM | 9.18.0.10 |
| MEDIUM | 06/06/11 | SPAM, BOTNET | www.speedxl.com |
| HIGH | 01/05/11 | PORN, MALWARE, CVE 2011-1079 | 27.1.3.1 |
| EXTREME | TODAY | MALWARE, BOTNET | 9.18.1.11 |

COOPERATIVE INTRUSION DETECTION ECOSYSTEM FOR IP REPUTATION-BASED SECURITY

BACKGROUND

1. Technical Field

This disclosure relates generally to security systems for computer networks.

2. Background of the Related Art

Computers are subject to many kinds of attacks, for example, attacks that are mounted by parties commonly known as hackers. A vandal such as a hacker may attempt to intrude upon a computer to steal information in an act of industrial espionage, or to implant a virus, or to alter records to the detriment or benefit of someone's interests or reputation. To combat such activities, computers may be monitored and protected by intrusion detection systems. An Intrusion Detection System (IDS) is a device or system that monitors a computer network and identifies potential threats.

Internet Protocol (IP) address "reputation" is an important concept in intrusion detection, and it is known that IDS software may be alerted about certain suspect IP addresses by an IP reputation service In particular, an IP reputation service hosts information associated with various IP addresses that have been identified to host suspect content including, without limitation, malware, phishing content, and/or spam. While an IDS typically does act to mitigate threats, the information provided by the IP reputation service provides additional capability to allow the IDS to block or warn end-users that particular IP addresses that are serving a request have been identified to host such content. It allows IDS software to be alerted by an IP reputation service when a suspect IP address (or URL) needs to have a "warning rating." For example, an IP address might have been the source of spam, or malware, or it may have been part of a botnet system or involved in some sort of other attack. The IP reputation service gives a warning rating to the IP address (or URL) which, in turn, warns its clients (typically IDS systems) to be careful with that IP address or URL.

A limitation of such IP reputation systems currently in practice, however, is that they are centrally managed and distributed. Usually, a vendor of the IDS software watches for suspect IP addresses and warns its IDS software clients about those reputation problems through a proprietary notification service. The use of a single central system, however, is a slow way to discover and propagate important IP reputation information. Indeed, with such centralized approaches, many client systems may be unnecessarily affected by rogue sources while waiting to be updated. For example, if a problem detected by an intrusion detection system in a network is not propagated to other IDSs in the same network immediately, there is a potential opening for an attack vector to get through to another device, perhaps using a different technique. This is particularly worrisome given the increasing incidents of Advanced Persistent Threats (APTs), where attacks to any particular network target are purposely designed to be "lightweight" and hard to detect. Indeed, often it is the analysis and combining of these "lightweight" events, potentially in real-time, that can provide a clue to true network vulnerabilities.

One known solution to this problem is for an intrusion detection system in the network to raise an alert to a Security Incident and Event Management (SIEM) system, which provides a central "command and control" style console; this approach, however, relies on human intervention to decide if multiple events constitute an organized attack. In most cases, these events are normally reviewed well after-the-fact, and it is very difficult for manual analysis to pick up a pattern, especially given that APTs raise only very low level events in IDSs.

BRIEF SUMMARY

An intrusion detection system (IDS) is enhanced to operate in a cluster of such systems, and IDSs organized into a cluster cooperate to exchange IP reputation influencing events information between or among the cooperating systems in real-time, or near real-time, to enhance overall system response time and to prevent otherwise hidden attacks (such as, without limitation, APTs) from damaging network resources. Preferably, an IDS includes an IP reputation analytics engine to analyze new and existing events (including, without limitation, information received from other IDS in the cluster), correlate information, and to raise potential alerts. The IP reputation analytics engines may implement an algorithm, such as a pattern matching algorithm, a continuous data mining algorithm, or the like, to facilitate this operation.

In a representative embodiment, a set of intrusion detection system endpoints are located in or across a computer network and configured into a cluster. Clustering IDS endpoints to share IP reputation influencing events, using the cluster-wide view to determine IP reputation, and feeding the cluster-wide view back to the IDS endpoints, provides for enhanced and early detection of threats that is much more reliable and scalable as compared to prior art techniques.

According to a more specific embodiment, an intrusion detection system endpoint is configured to be member of a cluster of cooperating detection systems. Preferably, the intrusion detection system is configured to define the data it will share with other IDSs, and what data it wants to receive. A "publish-subscribe" or similar mechanism may be used to register an IDS into the cluster and to facilitate data sharing. Once the cluster is configured, each IDS operates autonomously, but IP reputation influencing information is shared according to the de facto sharing agreement that is enforced by the publish-subscribe mechanism. As IP reputation influencing events are generated, an analytics engine (e.g., operating in a particular IDS) can make a determination regarding the reputation that will be associated with an IP address. This determination may be based on various factors, such as current level of the activity, the last date of the activity, the type of activity observed, and an associated IP address or URL (e.g., source or destination, or both). The IDS analytics engine takes this information and analyzes it, preferably together with similar information received from one or more other IDSs in the cluster. Based on the analysis, and optionally as defined in a security policy, an effective "cluster-wide" determination thus is made regarding the reputation that will be associated with the IP address. This notification may then be sent to an IP reputation service. From there, it can be analyzed, correlated with other information, and rated accordingly. This information and other IP reputation may then be forwarded back to the cluster, where it is maintained.

Thus, according to this disclosure, a cooperating cluster of intrusion detection systems share IP reputation information with each other, preferably on a local level. An IDS configured according to this disclosure includes a mechanism to distribute IP reputation information to other members of the cluster, and it may include an IP reputation analytics engine that resolves innocuous events in a received event stream into data about a potential attack that should be acted upon.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
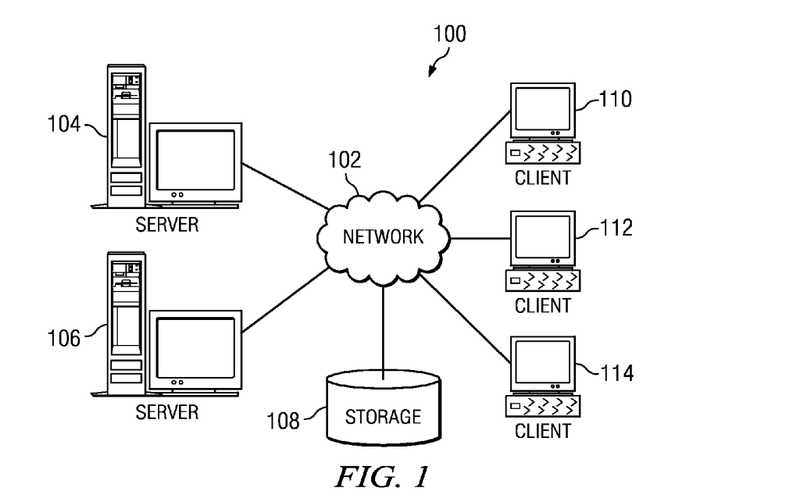
FIG. 1 depicts an exemplary block diagram of a distributed data processing environment in which exemplary aspects of the illustrative embodiments may be implemented.
Figure 2:
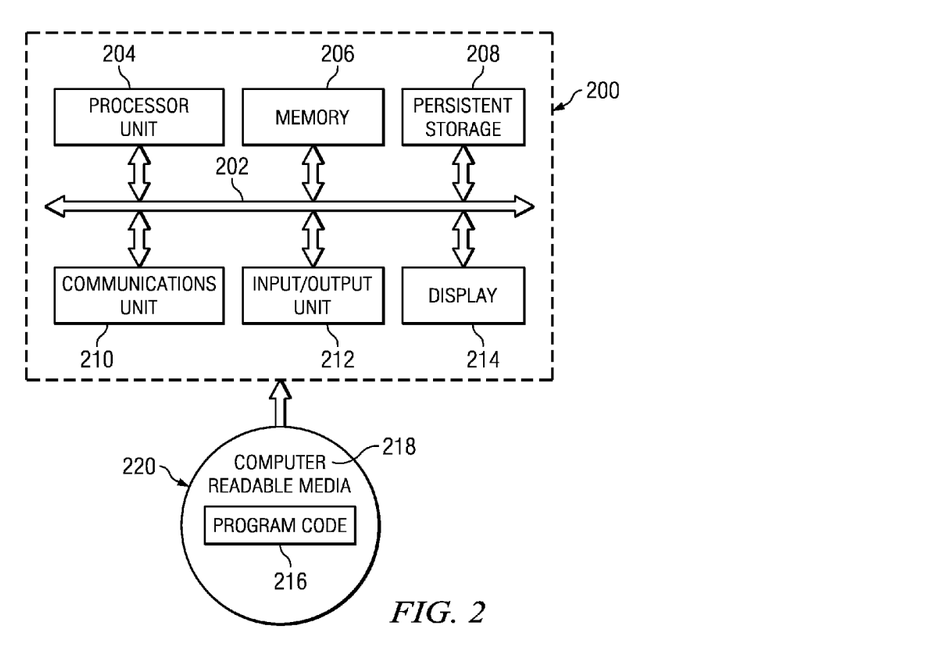
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
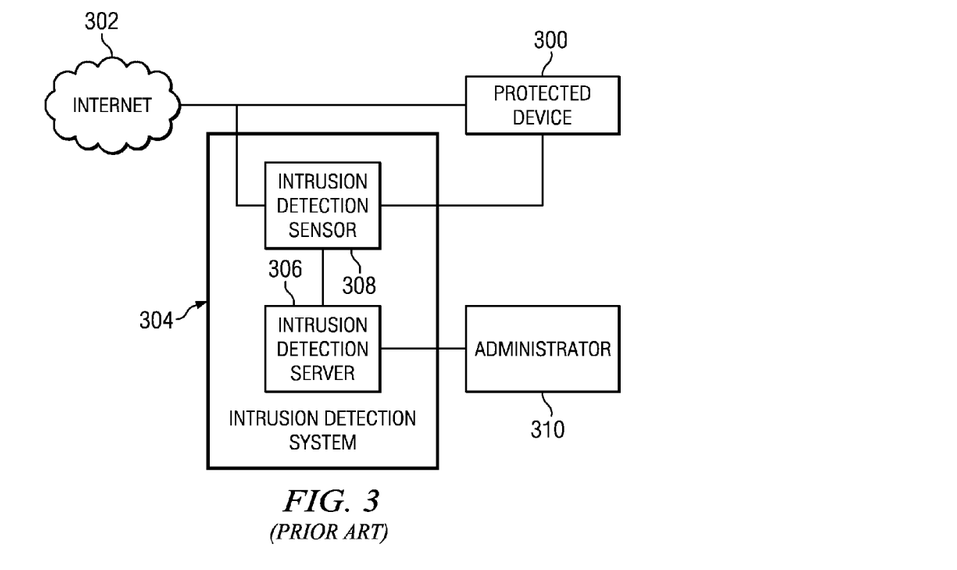
FIG. 3 illustrates a known intrusion detection system (IDS) in which the subject matter of this disclosure is implemented.

FIG. 3 illustrates a known intrusion detection system (IDS) for a computer network. In FIG. 3, a protected device 300, such as a computer, web server, workstation, or other similar device, is connected the Internet 302 or other communication network. Messages flow to the protected device 300 from sources local to the protected device 300, or from other sources (not shown) also connected to the Internet 302 or other communication network. Some of these messages may be emissaries of an attempt to intrude upon the protected device 300, such as an attempt to impede the operation of the protected device 300 by a denial-of-service attack. FIG. 3 also shows an intrusion detection system 304, the primary purpose of which is to detect such intrusions by alerting an administrator 310 of suspected intrusions. The intrusion detection system 304 typically includes an intrusion detection server 306 and an intrusion detection sensor 308. Although FIG. 3 shows only a single protected device 300 and a single intrusion detection sensor 308, the intrusion detection server 306 may protect more than one device and may have more than one intrusion detection sensor associated therewith.

Figure 4:
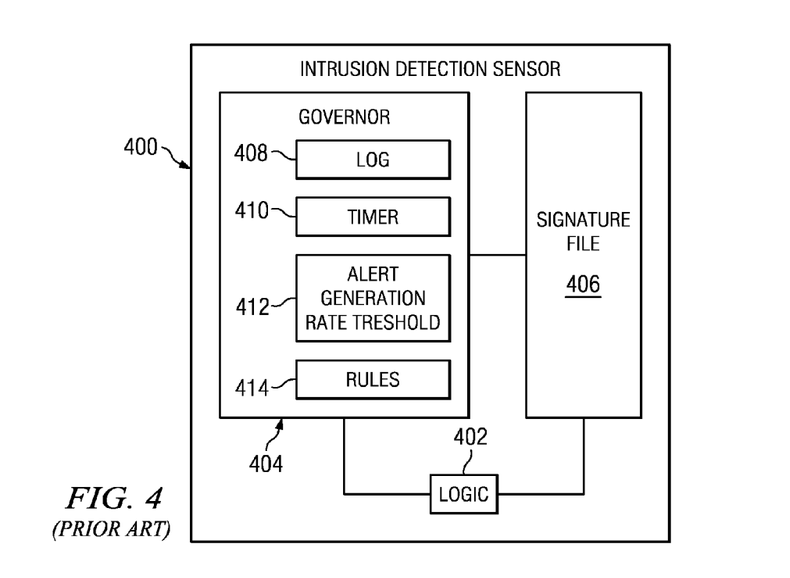
FIG. 4 illustrates an IDS sensor of the intrusion detection system.

FIG. 4 shows aspects of the structure of an intrusion detection sensor 400 (element 308, in FIG. 3). As shown in FIG. 4, the intrusion detection sensor 400 typically includes logic 402, which may be a programmable processor, and which oversees the operation of the intrusion detection sensor 400, a governor 404, and a signature file 406. This nomenclature should not be taken by way of limitation. The governor 404, which may be implemented as instructions executed by the logic 402, includes a log 408. Occurrences of alerts generated by the intrusion detection sensor 400 are recorded in the log 408; in one embodiment, the log is simply a list of timestamps that record the times at which the intrusion detection sensor 400 generates alerts. The timestamps may be used to determine a current alert-generation rate of the intrusion detection sensor 400 (i.e., the rate at which the intrusion detection sensor generates alerts at present). The governor 404 may also include a timer 410 for entering timestamps into the log, an alert-generation-rate threshold 412, which serves a point of comparison for the present alert-generation rate, and a rule or set of rules 414 that may be applied to elements of a signature set in response to the outcome of a comparison of the present alert-generation rate with the alert-generation-rate threshold 412. Operation of the timer 410, alert-generation-rate threshold 412, and rules 414 may be carried out by instructions executed by the logic 402.

Figure 5:
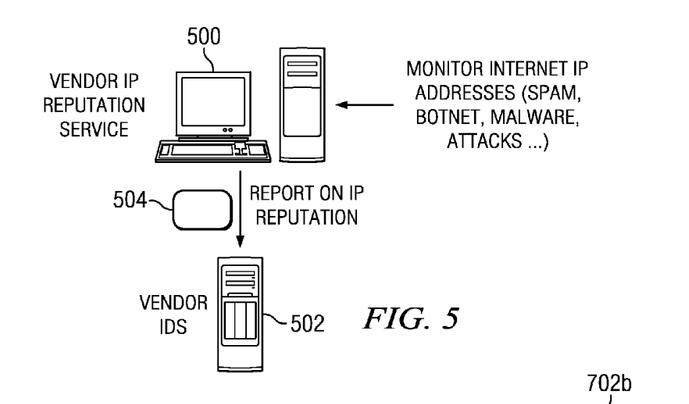
FIG. 5 illustrates a known IP reputation service.

FIG. 5 illustrates a known vendor-based IP reputation service 500 and how it interacts with a vendor-specific intrusion detection system. As seen here, the vendor IP reputation service 500 monitors Internet IP addresses and receives information indicative of one or more exploits (e.g., spam, botnets, malware, and the like). The vendor-based IP reputation service is centrally-managed. In operation, it watches for suspect IP addresses and warns its IDS software clients 502 by issuing an IP reputation report 504.

Figure 6:
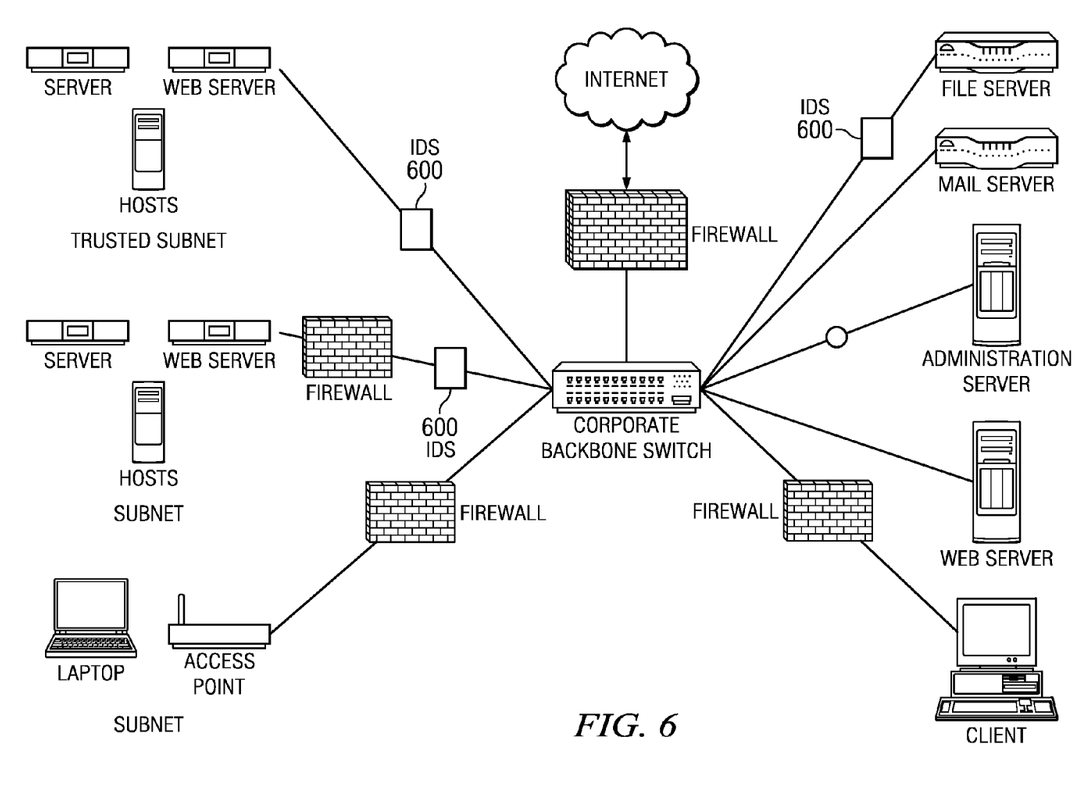
FIG. 6 illustrates an enterprise network having a set of IDSs.

The intrusion detection system of FIG. 3 may be implemented in a data processing system such as illustrated in FIG. 1; multiple such systems may be implemented in or across a network, such as an enterprise network. FIG. 6 illustrates one such network having a set of intrusion detection systems, each represented by reference numeral 600. There may be many such IDS systems within or across the network.

An IDS as described herein may comprise various hardware and/or software components and be configured as one or more of: a system, a machine, an appliance, a device, a program, a set of programs, a process, a set of processes, one or more execution threads or instances, associated data, and the combinations thereof. IDS functionality may be integrated and co-located, or discrete and separate.

Figure 7:
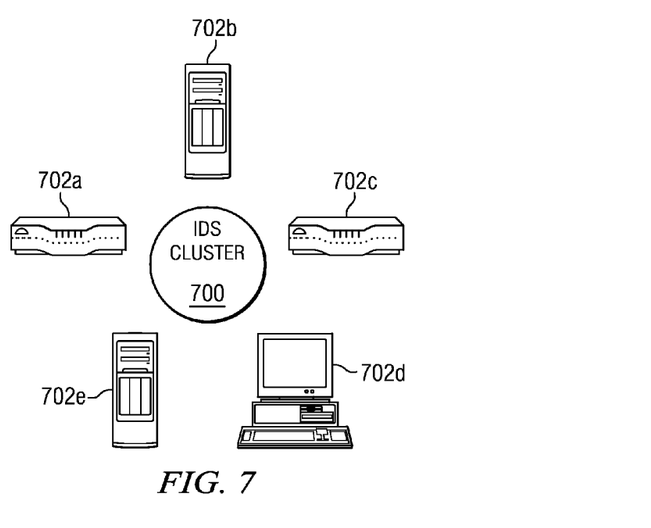
FIG. 7 illustrates a representative IDS cluster according to this discourse.

With the above as background, the techniques of this disclosure are now described.
Cooperative Intrusion Detection for IP Reputation-Based Security As described above, according to this disclosure, an intrusion detection system (e.g., an IDS endpoint in an enterprise network) is configured to be member of a cluster of cooperating detection systems. An IDS cluster comprises two or more (and, typically, many more) intrusion detection systems, however each particular IDS is configured. FIG. 7 illustrates a representative IDS cluster 700 as comprising IDS 702a . . . 702n. The number of IDSs (sometimes referred to as "IDS instances") in the cluster may be fixed, or the number may vary. Thus, typically the membership of a particular cluster will change dynamically as individual IDSs join or leave the cluster.

Although a dedicated controller may be used, preferably any IDS in the cluster may act as a "leader" of the cluster and be responsible for managing the member subscriptions to the cluster. A leader election algorithm may be used for this purpose, and the individual IDSs in the cluster may communicate with one another via a communication mechanism such as Spread. In the alternative, multiple IDS instances in the cluster may simply operate concurrently.

Figure 8:
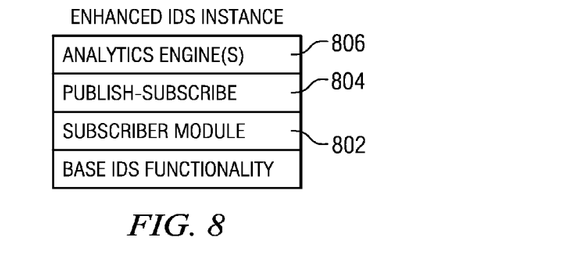
FIG. 8 illustrates a representative IDS instance according to this disclosure.

In a preferred embodiment, and with reference to FIG. 8, an IDS 800 adapted to include the functionality of this disclosure is configured to include a subscriber module 802 by which it registers to the cluster. The subscriber module is configurable (e.g., by a web-based configurator tool) to define the data that the particular IDS will share with other IDSs in the cluster, and to define what data the particular IDS wants to receive from one or more IDS instances. Typically, and as will be described in more detail below, the data is IP reputation influencing information, meaning information that can be evaluated to determine (generate or calculate) a "reputation" of an IP address. Known IP reputation data analysis techniques may be implemented for this purpose, or such techniques may be enhanced in the manner described below. In either case, preferably a "publish-subscribe" or similar mechanism 804 may be used to register an IDS into the cluster and to facilitate such data sharing. In the alternative, such configuration options and related data may be located in a database that is accessible by each of the subscribing IDS instances in the cluster. Once the cluster is configured, preferably each IDS operates autonomously, but IP reputation influencing information is shared according to the de facto sharing agreement that is enforced by the publish-subscribe (or other data sharing) mechanism.

In addition to the subscriber module, the IDS 800 also includes one or more analytics engines 806. In particular, as IP reputation influencing events are generated, an analytics engine 806 can make a determination regarding the reputation that will be associated with an IP address. This determination may be based on various factors, such as current level of the activity, the last date of the activity, the type of activity observed, and an associated IP address or URL (e.g., source or destination, or both). The IDS analytics engine 806 takes this information and analyzes it, preferably together with similar information received from at least one or more other IDSs in the cluster. Based on the analysis, and optionally as defined in a security policy, an effective "cluster-wide" determination thus is made regarding the reputation that will be associated with the IP address. This notification may then be sent to an IP reputation service as described above and illustrated in FIG. 5. From there, it can be analyzed, correlated with other information, and rated accordingly. This information and other IP reputation may then be forwarded back to the cluster, where it is maintained. Typically, the IP reputation service is distinct from the IDS cluster, but this is not a requirement.

In addition to the components 802, 804 and 806, the IDS may include the basic functionality (or portions thereof) as described above with respect to FIG. 3 and FIG. 4. One of more of these functionalities may be integrated or discrete, and/or co-located or distributed from one another. IDS functionality may be implemented by another component, such as a software agent. Thus, the term IDS should not be taken to limit this disclosure.

Thus, according to this disclosure, a cooperating set of intrusion detection systems share IP reputation information with each other. An IDS configured according to this disclosure includes a mechanism (e.g., publish-subscribe mechanism) to distribute IP reputation information to other members of the cluster, and it may include an IP reputation analytics engine that resolves innocuous events in a received event stream into data about a potential attack that should be acted upon.

Figure 9:
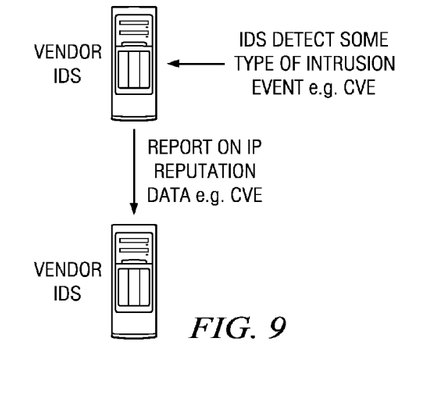
FIG. 9 illustrates a first intrusion detection system reporting an intrusion event to second IDS in the cluster.

By clustering IDS instances and using publish-subscribe (or other equivalent) communication mechanisms, immediate exchange of IP reputation information among the cluster members is facilitated. Of course, the number of members is not limited. In this manner, if the intrusion detection system at the perimeter of the organization's network detects some sort of event, it can warn other IDSs in the local cluster. In a more concrete example, the initial event may be an attack with a known CVE signature, and the IDS then passes that data to other subscribed IDSs in the cluster. FIG. 9 illustrates this scenario. In this case, the primary data to share is the CVE (Common Vulnerability and Exposures) data and source and destination IP address, and the actual IP reputation value may not even have been calculated and passed.

Figure 10:
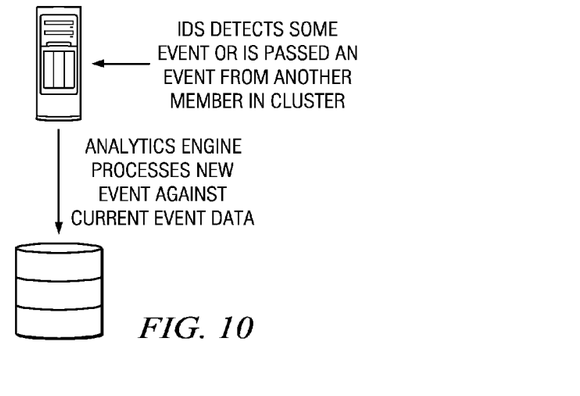
FIG. 10 illustrates IP reputation influence information being received and passed to an analytics engine within an IDS instance according to this disclosure.

When the data is received at an IDS, preferably it is immediately passed to the IP reputation analytics engine that then attempts to correlate this incident against any event it has recorded itself, or that has been previously passed by other IDSs in the same cluster. FIG. 10 illustrates this operation. For example, if another IDS detects an attack from the same IP address, perhaps using a different method, the two events can be correlated locally (by the analytics engine in a particular IDS) to indicate a clear pattern. Indeed, by correlating such information from multiple sources, a more targeted attack (such as an Advanced Persistent Threat (APT)) may be indicated. This approach of enabling a given IDS to analyze a local event stream against information received from another IDS source in the cluster also allows actions to be taken in real-time, or in near real-time, given potential threat vectors that impact multiple network resources (or that reflect a distributed attack). Additionally, and as will be described below, the analytics engine may also implement a background data mining task to analyze the data collected (which may be large in volume) to find other potential events of interest.

Without limitation, the IDS may act on the output from its analytics engine in one or more ways. In one embodiment, the IDS's operating mode is changed to heightened alerting or blocking; in an alternative embodiment, the IDS creates a new alert to send to one or more other cluster subscribers, or to a central IP reputation service.

The following provides additional details regarding the functionality of the IDS of this disclosure.

Figure 11:
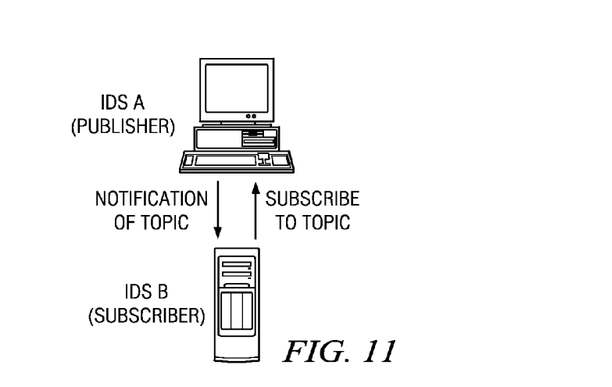
FIG. 11 illustrates a pair of IDS instances executing a publishing/subscription communication method for information exchange.
Figure 12:
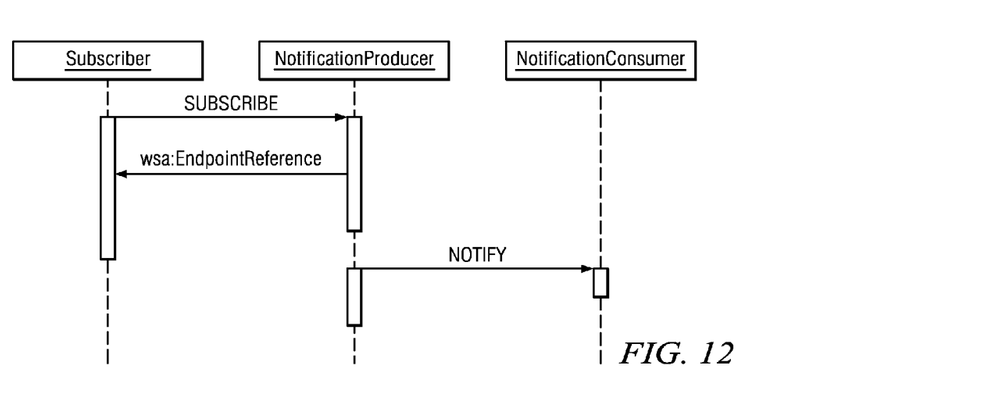
FIG. 12 illustrates a representative publish-subscribe mechanism implemented as a WS-Notification service.

As described above, the first step is to configure the cluster of IDS instances. The "publish-subscribe" model is illustrated in FIG. 11. In this example, IDS A acts as a publisher, and IDS B acts as the subscriber. The information exchange is defined by IDS A issuing a notification of the topic it is publishing, and IDS B subscribing to the topic. In an example, IDS A is configured to publish a set of event types/ratings it will pass on to other IDSs in the cluster. In another example, IDS A is a perimeter IDS connected to the Internet. Because it is connected to the Internet, the number of IP reputation events logged by IDS A may be extremely high; thus, while IDS A may be willing to publish all such events, IDS B may elect to subscribe to only certain of such events. On the other hand, if IDS A is monitoring for IP reputation events from deep in the core of the Company's network, IDS B may subscribe to all such events because they may be of more interest. Thus, the nature and scope of any subscription may be quite varied.

The particular subscription-notification mechanism may be of any convenient type, depending on implementation. In an exemplary embodiment, the subscription-notification mechanisms specified by WS-Notification can be utilized. WS-Notification provides an open standard for Web services communication using a topic-based publish/subscribe messaging pattern. Although the specific WS-Notification will depend on the cluster implementation details, in one example embodiment the notification service may be implemented using IBM® WebSphere® Application Server V7.0, which implements WS-Notification based on the Java API for XML-based Web Services (JAX-WS), known as Version 7.0 WS-Notification.

In the alternative, the subscription-notification mechanism specified in the OGSI (Open Grid Services Infrastructure) can be used. Other publish-subscribe (pub-sub) mechanisms that may be used for this purpose include, without limitation, WSP, available from Microsoft®.

Generalizing, and as seen in FIG. 11, the notification service includes a notification producer component that executes in a first intrusion detection system, and a notification consumer component that executes in a second intrusion detection system. Each such component is implemented in software, stored in computer memory as a set of computer program instructions, and executed by one or more processors as a specialized or dedicated machine. Using an appropriate web-based or programmatic interface, one or more "Subscriptions" are created. A Subscription is a WS-Resource that represents a relationship among a notification consumer component, a notification producer component, a topic, and various other filter expressions, policies and context information. A Subscriber is an entity (in this case, an IDS in the cluster) that acts as a service requestor, sending a subscribe request message to a notification producer component. A Subscriber may differ from the notification consumer component. To produce a notification service with additional scale, a subscription manager and/or subscription broker component may be implemented, in a known manner consistent with the WS-Notification specification.

Using a pub-sub model of this type, a particular IDS instance subscribes to updates from one or more other IDSs in the cluster. This allows each intrusion detection system to receive desired notifications. The notifications may be quite varied, and they may be provided in any format. Thus, any Topic within the meaning of the WS-Notification specification may be implemented. The notifications provide the subscribing IDS with up-to-date and time information. Thus, without limitation, the notifications may be of any nature and type. They may be coarse-grained or fine-grained, and they may be provided periodically (every hour, minute, or seconds) or asynchronously (as particular events occur), or some combination thereof. The notifications may be resource-specific. Of course, all of these examples are merely for illustrative purposes and should not be considered limiting.

Figure 13:
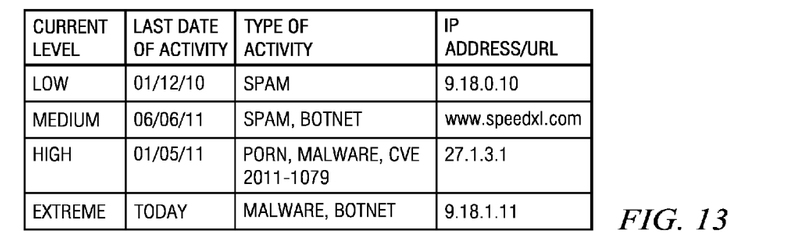
FIG. 13 illustrates representative IP reputation influencing information that may be processed by an analytics engine in an intrusion detection system.

An intrusion detection system (such as illustrated in FIG. 8) may create IP reputation information from an event in a manner that is now described. In a preferred approach, IP reputation is based on the type of content (e.g., spam, malware, porn, botnet, anonymous proxy, Common Vulnerability and Exposures (CVE)), how recently the event has occurred, as well as how often it has occurred. Thus, as seen in the Table in FIG. 13, which is merely exemplary, preferably there are four (4) distinct aspects to a given IP reputation event, namely: current level (e.g., low, medium, high, extreme), last date of activity, type of activity observed, and IP Address/URL (perhaps both source and destination). This data comprises or is sometimes referred to herein as IP reputation influencing information.

Figure 14:
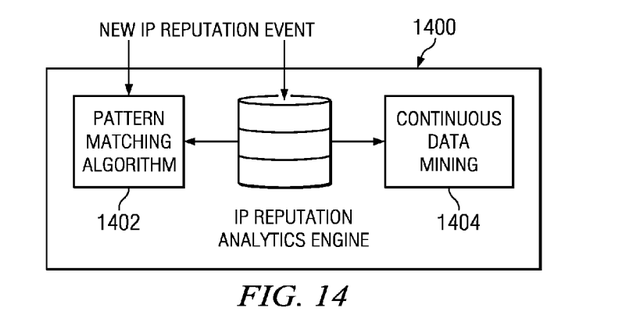
FIG. 14 illustrates a representative analytics engine.

An intrusion detection system (such as illustrated in FIG. 8 may include one or more analytics engine(s) to process the local events, typically in association with IP reputation influencing information received from one or more other subscribing IDS instances in the cluster. In this manner, the IP reputation generated is "cluster-wide" or "cluster-based." Preferably, an analytics engine is run in each IDS in the cluster (although this is not required) and provides the IDS the ability to analyze new and existing events, to correlate information, and to detect a threat to the network. A number of algorithms may be implemented within an analytics engine (or multiple instances of such engines). As seen in FIG. 14, these algorithms may include, without limitation, a pattern matching algorithm 1400, and a continuous data mining algorithm 1402. Other algorithms, such as those characterized as artificial intelligence, may be implemented as well.

Figure 15:
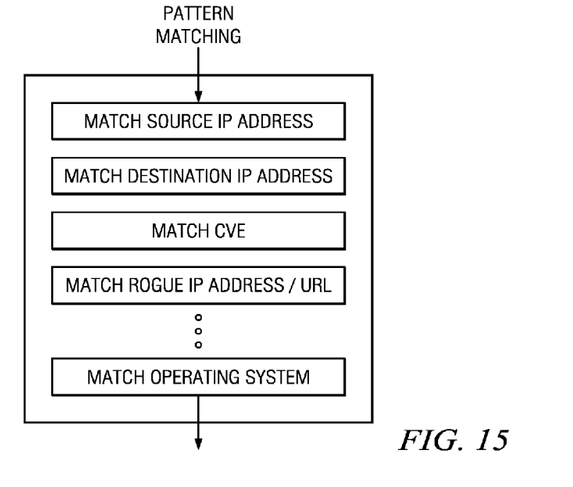
FIG. 15 illustrates a representative pattern matching algorithm.

The following provides additional details regarding a representative analytics engine that uses pattern matching. Generally, pattern matching may involve matching across one or more criteria including, without limitation, source IP address, destination IP address, CVE, rogue IP address/URL, operating system, and the like. FIG. 15 illustrates the approach of comparing an event stream against one or more matching criteria. As noted above, preferably an analytics engine takes at least one IP reputation event received from another intrusion detection system in the cluster and matching that event with other events in the database. Some non-limiting examples of this processing may be as follows. In a first example, an IP address has been detected by another intrusion detection system as being the creator of a phishing attack, and that IP address has been registered within the analytics engine. The current IDS notes that there is an SSL session (e.g., from an internal host) to that IP address and correlates the two events. As another example, assume an intrusion detection system in one part of the network identifies a sequence of packets belonging to a known Windows exploit; it records the IP address and forwards the event to other members in the cluster. Now, assume another system in a different part of the network detects a known Linux kernel exploit from the same IP address. The two events are correlated (by one of the systems in the cluster) and a high level alert is then raised (and distributed across the cluster). Another example is a first system that detects an AIX® exploit attempt against a server. It correlates that data to information (received from another IDS instance) about a prior attack on the server from a different AIX exploit; the correlated data indicates a repeated effort to obtain access, and an alarm is raised. In each case, the IDS analytics engine processes the data, preferably with at least some data received from another cluster member, to generate IP reputation (or others) data possibly or definitely indicative of a threat to the network.

The analytics engine may output IP reputation data, or it may further process that data and generate threat indication data.

The analytics engine may also implement data mining techniques. These techniques may supplement the pattern matching, or they may be used in lieu of the pattern matching. Typically, data mining is used to supplement the pattern matching, as data mining algorithms typically involve analysis of large amounts of data. Indeed, a continuous data mining algorithm may involve a number of different algorithms including, without limitation, anomaly detection, clustering, and classification. Some non-limiting examples that might trigger a positive threat detection in a data mining sample are as follows: an access event at a time and from a source that would be considered unusual (e.g., a file system access outside of normal work hours, and from an external IP address); detection of protocols that are currently not used within the environment (e.g., an NFS client request when NFS is not running in the environment); detection of a single password failure attempt, without an immediate successful password event, with the same user name four times over the last 30 days (this might indicate that someone is trying a slow "brute force" attack against an account and is allowing the user to login between attempts to clear any password failure history); three (3) connection attempts to an external un-allowed IP address range, using different port numbers, from different servers within the core network (e.g., with these attempts have been spread over a two month period and have been detected by other IDSs in each case). Of course, there may be many other types of events.

As a variant embodiment, an IP Reputation analytics engine (especially in the data mining scenario) may be executed in association with an SIEM system.

Typically, each IDS cluster comprises IDS instances from a same vendor, but this is not a limitation. If desired, the use of IP reputation event forwarding and the use of an analytics engine as described herein may be extended beyond a cluster of IDS's from the same vendor. For example, a large multinational Company that has acquired another company may have two vendors IDSs within its network and would like to extend the cluster across both IDS technologies. In this case, two additional requirements may be implemented. In particular, IP reputation event information would benefit from being standardized, perhaps using the Common Vulnerability Reporting Format (CVRF), which could be tailored to provide IP reputation rating and associated data. In this alternative embodiment, before a third party IDS instance might subscribe to events, it may be necessary or desirable that the format of the message protocols be standardized. As described above, the basis of the notification could use a system such as that defined by the WS-Notification family of standards. All of these variants are within the scope of this disclosure.

The subject matter described herein has many advantages. Clustering IDS endpoints to share IP reputation influencing events, using the cluster-wide view to determine IP reputation, and feeding the cluster-wide view back to the IDS endpoints, provides for enhanced and early detection of threats (including Advanced Persistent Threats) that is much more reliable and scalable as compared to prior art techniques. The techniques described herein enable threat information to be shared in real-time or near real-time. Systems are better protected. The described approach further eliminates the need for central systems to be involved, thereby immediately reducing the time delay at which IP reputation information can be distributed and analyzed.

The specific details of any particular pattern matching and/or data mining algorithms are not within the scope of this disclosure as any such algorithms may be used within the cluster.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The technique described herein also may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the endpoint identity and tracking functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the process flows described above are implemented in a special purpose computer, preferably in software executed by one or more processors. The software is maintained in one or more data stores or memories associated with the one or more processors, and the software may be implemented as one or more computer programs. Collectively, this special-purpose hardware and software comprises or supplements an existing intrusion detection system solution.

Without meant to be limiting, preferably a management server management console exposes one or more web-based interfaces that may be used to create and/or modify an IDS instance endpoint, to set configuration parameters applicable to a particular IDS endpoint, to configure the analytics engine, to configure notifications, and the like.

The described functionality may be implemented as an adjunct or extension to an existing IDS instance solution including, without limitation, an IDS endpoint client (agent), an endpoint management or relay server, or the like.

While the above describes a particular order of operations performed by certain embodiments of the disclosed technique, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Any application or functionality described herein may be implemented as native code, by providing hooks into another application, by facilitating use of the mechanism as a plug-in, by linking to the mechanism, and the like.

The cluster may be implemented within other security systems and appliances, including IPS, SIEM and vulnerability management systems.

Having described our invention, what we now claim is as follows.

The invention claimed is:

1. A method for threat detection in a computer network, comprising:
    organizing into a cluster a set of intrusion detection systems;
    sharing IP reputation influencing information between or among at least some of the intrusion detection systems in the cluster;
    at a particular intrusion detection system in the cluster, processing event information local to the particular intrusion detection system and at least some of the IP reputation influencing information received from at least one other intrusion detection system in the cluster, wherein the processing is carried out in software executing in a hardware element;
    based on the processing, determining that given IP reputation data is indicative of a threat to the computer network, the given IP reputation data representing a cluster-wide view of IP reputation based at least in part on the shared IP reputation influencing information.

2. The method as described in claim 1 wherein a given intrusion detection system in the cluster subscribes to and becomes a member of the cluster by identifying IP reputation influencing information the given intrusion detection system shares with other members of the cluster, and identifying IP reputation influencing information the given intrusion detection system receives from one or more other members of the cluster.

3. The method as described in claim 1 wherein the IP reputation influencing information is shared via publication/subscription.

4. The method as described in claim 1 wherein the processing executes a pattern matching algorithm.

5. The method as described in claim 1 wherein the processing executes a data mining algorithm.

6. The method as described in claim 1 further including distributing the given IP reputation data among the cluster.

7. The method as described in claim 1 wherein the local event information includes one of: a current level of an activity, a last date of the activity, a type of the activity, and an IP address or URL associated with the activity.

8. The method as described in claim 1 further including:
  receiving a request for IP reputation data from an intrusion detection system;
  determining whether the intrusion detection system that issued the request is a member of the cluster; and
  if the intrusion detection system that issued the request is a member of the cluster, providing the IP reputation data.

9. Apparatus, comprising:
  a processor;
  computer memory holding computer program instructions that when executed by the processor perform a method for threat detection in a computer network, the method operative within a set of intrusion detection systems that are organized into a cluster, the method comprising:
    receiving IP reputation influencing information from at least some of the intrusion detection systems in the cluster;
    processing event information local to the apparatus and at least some of the IP reputation influencing information received from at least one other intrusion detection system in the cluster;
    based on the processing, determining that given IP reputation data is indicative of a threat to the computer network, the given IP reputation data representing a cluster-wide view of IP reputation based at least in part on the shared IP reputation influencing information.

10. The apparatus as described in claim 9 wherein a given intrusion detection system in the cluster subscribes to and becomes a member of the cluster by identifying IP reputation influencing information the given intrusion detection system shares with other members of the cluster, and identifying IP reputation influencing information the given intrusion detection system receives from one or more other members of the cluster.

11. The apparatus as described in claim 9 wherein the IP reputation influencing information is received via publication/subscription.

12. The apparatus as described in claim 9 wherein the processing executes a pattern matching algorithm.

13. The apparatus as described in claim 9 wherein the processing executes a data mining algorithm.

14. The apparatus as described in claim 9 wherein the method further includes distributing the given IP reputation data among the cluster.

15. The apparatus as described in claim 9 wherein the local event information includes one of: a current level of an activity, a last date of the activity, a type of the activity, and an IP address or URL associated with the activity.

16. The apparatus as described in claim 9 wherein the method further includes:
  receiving a request for IP reputation data from an intrusion detection system;
  determining whether the intrusion detection system that issued the request is a member of the cluster; and
  if the intrusion detection system that issued the request is a member of the cluster, providing the IP reputation data.

17. A computer program product in a non-transitory computer readable medium, the computer program product holding computer program instructions which, when executed by a data processing system, perform a method operative within a set of intrusion detection systems that are organized into a cluster, the method comprising:
  receiving IP reputation influencing information from at least some of the intrusion detection systems in the cluster;
  processing event information local to the data processing system and at least some of the IP reputation influencing information received from at least one other intrusion detection system in the cluster;
  based on the processing, determining that given IP reputation data is indicative of a threat to the computer network, the given IP reputation data representing a cluster-wide view of IP reputation based at least in part on the shared IP reputation influencing information.

18. The computer program product as described in claim 17 wherein a given intrusion detection system in the cluster subscribes to and becomes a member of the cluster by identifying IP reputation influencing information the given intrusion detection system shares with other members of the cluster, and identifying IP reputation influencing information the given intrusion detection system receives from one or more other members of the cluster.

19. The computer program product as described in claim 17 wherein the IP reputation influencing information is received via publication/subscription.

20. The computer program product as described in claim 17 wherein the processing executes a pattern matching algorithm.

21. The computer program product as described in claim 17 wherein the processing executes a data mining algorithm.

22. The computer program product as described in claim 17 wherein the method further includes distributing the given IP reputation data among the cluster.

23. The apparatus as described in claim 17 wherein the local event information includes one of: a current level of an activity, a last date of the activity, a type of the activity, and an IP address or URL associated with the activity.

24. The apparatus as described in claim 17 wherein the method further includes:
  receiving a request for IP reputation data from an intrusion detection system;
  determining whether the intrusion detection system that issued the request is a member of the cluster; and
  if the intrusion detection system that issued the request is a member of the cluster, providing the IP reputation data.

25. Intrusion detection system (IDS) apparatus, comprising:
  a processor;
  computer memory holding computer program instructions that when executed by the processor perform a method comprising:
    subscribing into a cluster of IDS endpoints;
    receiving IP reputation influencing information from at least some of the intrusion detection systems in the cluster;
    processing, using an analytics engine, event information local to the apparatus and at least some of the IP reputation influencing information received from at least one other intrusion detection system in the cluster;

based on the processing, determining that given IP reputation data is indicative of a threat to the computer network, the given IP reputation data representing a cluster-wide view of IP reputation based at least in part on the shared IP reputation influencing information.

* * * * *